United States Patent [19]

McKee

[11] 4,114,167
[45] Sep. 12, 1978

[54] MINIATURIZED MODEL KITCHEN HAVING COORDINATED INTERCHANGEABLE AND INTEGRATABLE MODULES

[76] Inventor: Harry A. McKee, 6851 Roswell Rd., Atlanta, Ga. 30328

[21] Appl. No.: 800,617

[22] Filed: May 26, 1977

Related U.S. Application Data

[62] Division of Ser. No. 757,398, Jan. 6, 1977.

[51] Int. Cl.² ............................................. G03B 29/00
[52] U.S. Cl. ..................................... 354/81; 35/7 R; 35/16; 352/50; 354/293
[58] Field of Search ................... 354/81, 293; 352/48, 352/52, 53, 54, 87, 90, 243; 35/7 R, 7 A, 16

[56] References Cited

U.S. PATENT DOCUMENTS

| 2,127,047 | 8/1938 | Pinney | 35/7 R |
| 2,221,766 | 11/1940 | Harris et al. | 35/7 R |
| 2,317,124 | 4/1943 | Adams | 35/7 R |
| 2,405,808 | 8/1946 | Armbright | 35/7 R |
| 2,528,211 | 10/1950 | Civkin et al. | 35/7 A |
| 3,415,600 | 12/1968 | Yarbrough | 352/50 |
| 3,603,004 | 9/1971 | Fink | 35/16 |
| 3,659,353 | 5/1972 | D'Agrosa | 35/16 |

FOREIGN PATENT DOCUMENTS

2,274,095  1/1976  France ........................................ 35/16

*Primary Examiner*—Russell E. Adams
*Attorney, Agent, or Firm*—Jones, Thomas & Askew

[57] ABSTRACT

A miniaturized model kitchen which is used for simplified planning of full sized kitchens and immediate, scaled reproduction thereof in full color prospective view and plan view photographs comprises a foldable stand with a rotatable floor planning surface which bears scaled grid markings representative of floor area dimensions and two camera mounts over the floor surface. Various miniature cabinet and appliance models are provided for the model kitchen, with several cabinet models having an upper body representative of an upper kitchen cabinet and/or range hood integrally supported above a lower body representative of a lower kitchen cabinet and/or appliance by a vertical support which represents a lay-up panel. The models include a written identification on the top surfaces thereof to indicate the corresponding full sized cabinets and/or appliances, and an instant color camera mounted on the camera mount can photograph the model kitchen either in perspective view or in plan view with the identification of the corresponding full size cabinets and appliances appearing in the plan view picture.

4 Claims, 13 Drawing Figures

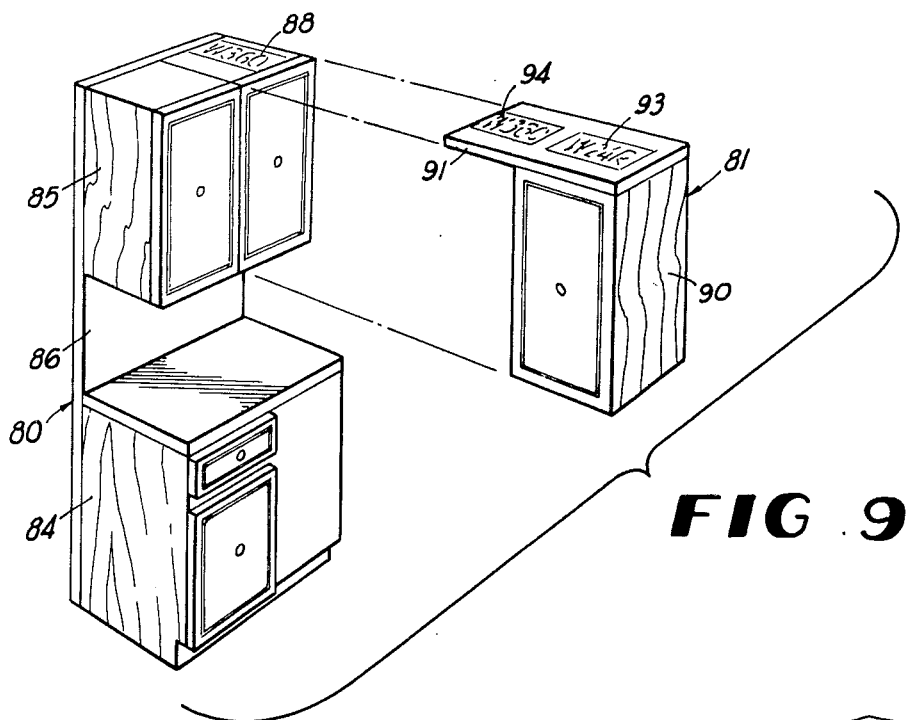
FIG. 9
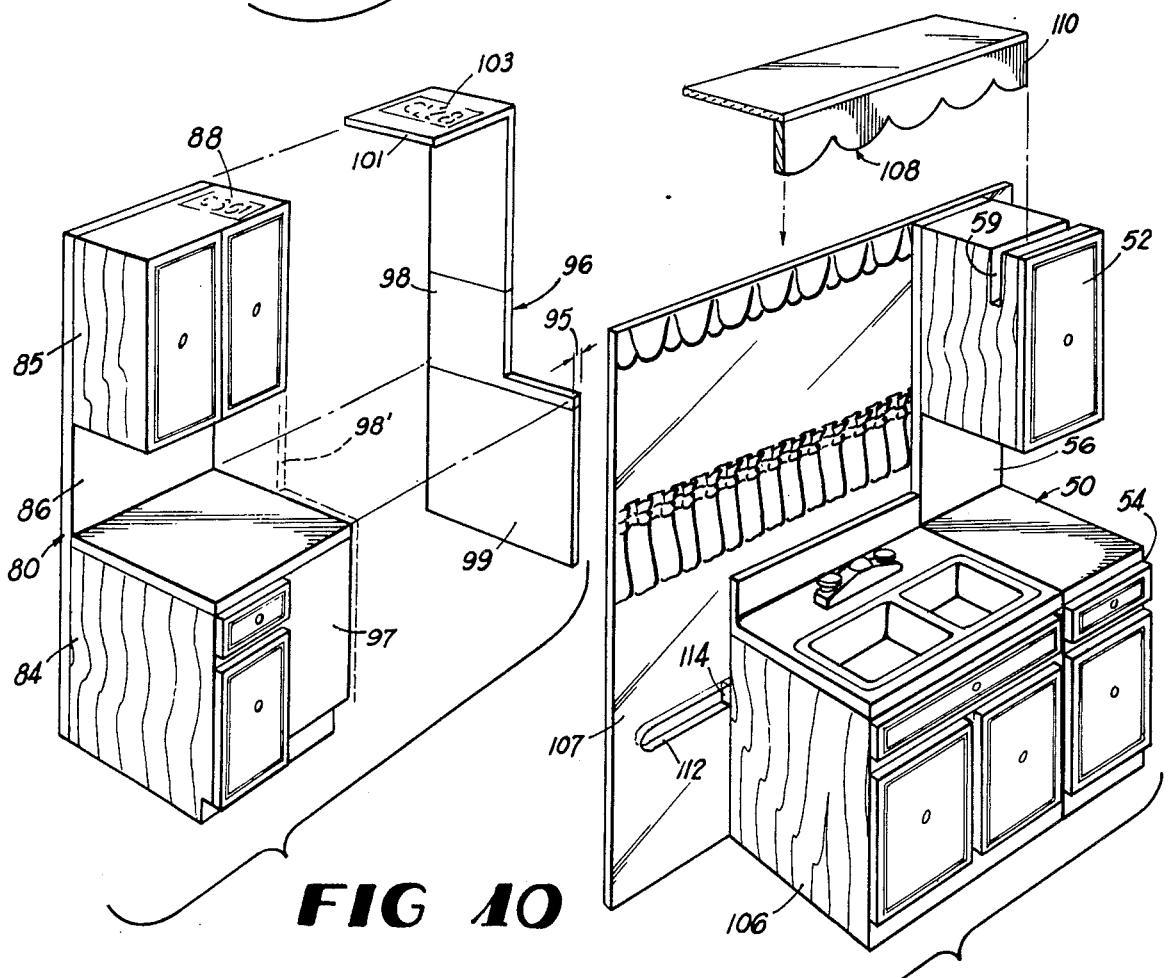
FIG. 10
FIG. 11

MINIATURIZED MODEL KITCHEN HAVING COORDINATED INTERCHANGEABLE AND INTEGRATABLE MODULES

This is a division of application Ser. No. 757,398, filed Jan. 6, 1977.

BACKGROUND OF THE INVENTION

This invention relates to miniaturized models for use in designing, displaying and photographing kitchens and other room arrangements.

Kitchens typically have a number of units mounted in tandem along the kitchen walls. Frequently they also have peninsulas or islands of grouped units. These units or modules include storage spaces such as cabinets mounted upon the floor, elevated cabinets mounted to the walls or suspended from the ceiling, sinks and major appliances such as refrigerators, ovens, ranges and dishwashers. The units come in a variety of styles, sizes and colors which render proper kitchen design quite difficult. One having a kitchen designed by a professional designer or builder may often specify that the kitchen include certain units without realizing how the units will ultimately bear on the overall design achieved after the designer has included these under the constraints presented by the kitchen room dimensions, style and color coordination considerations, and costs limitations. These same design difficulties make the training of professional kitchen designers and salesmen difficult and time consuming, particularly when prospective view and plan view renderings are required for presentation. Also in this age of do-it-yourself with the multiplicity of factory made cabinet sizes the owner/designer's job of conceiving and conceptionalizing his future kitchen that may actually be constructed without space over-runs and underruns and with proper cabinet utilization and arrangement and type appliance and color coordination desired is made particularly difficult.

SUMMARY OF THE INVENTION

In one form of the invention a kit is provided for constructing a miniaturized model kitchen and includes a stand with a rotatable floor planning surface bearing scaled grid markings representative of floor area dimensions and bounded by a fixed race. A pair of mutually traversed movable races overlies the floor with race ends movably supported upon the fixed race. Kitchen wall openings such as door or window designators are movably supported on one or more of the races. A multiple number of scale model cabinets and appliances are provided in the kit for easy arrangement on the floor planning surface and each model cabinet and appliance bears written indicia which indicates the corresponding full size cabinet or appliance. Camera mounts are provided on the stand and a camera can be mounted on either of the mounts for photographing the model kitchen and the floor of the model kitchen is rotatable so that various camera angles are attainable without having to move and refocus the camera.

Many of the modules provided for the miniaturized model kitchen include an upper body representative of an upper cabinet and/or hood integrally supported above a lower body representative of a lower cabinet and/or appliance by a vertical support extending between mutually aligned backs of the upper and lower bodies, thereby providing modules with correctly coordinated upper and lower bodies that can be easily moved about and positioned on the scaled floor like chessmen on a chessboard.

Accordingly, it is a general object of the present invention to provide a miniaturized model kitchen which can be easily used to plan a full sized kitchen.

Another general object of the invention is to provide interchangeable and integratable units or modules for miniaturized model kitchens and other rooms.

More specifically, it is an object of the invention to provide a kit for assembling a miniaturized model kitchen, with a floor planning surface bearing dimension markings with means for easily altering the room size and for designating and relocating kitchen wall openings such as doors and windows, and with scaled models of cabinets and appliances having indicia thereon which identify the corresponding full size cabinets and appliances.

Another object of the invention is to provide a kit for arranging a miniaturized model kitchen of the type just described with a camera mount and with a rotatable floor surface so that photographs of the model kitchen can be made at various angles about the model kitchen.

Another object of the invention is to provide integral modules for a miniaturized model kitchen that represent properly coordinated upper and lower cabinets and/or appliances and the wall or lay-up panel therebetween.

Another object of the invention is to provide integral modules for a miniaturized model kitchen that represent both upper and lower cabinets and/or appliances located away from the kitchen wall as in peninsula or island clusters of units.

Another object of the invention is to provide modules for a miniaturized model kitchen of the type described with ready identification means which identify the corresponding full size cabinet or appliance.

Yet another object of the invention is to provide modules for a miniaturized model kitchen with means for readily mounting the modules to other modules and thereby effecting a change in the other modules identifications.

BRIEF DESCRIPTION OF THE DRAWING

FIGS. 9, 10 and 11 are perspective views of modules for a miniaturized model kitchen embodying principles of the invention in alternative forms.

DETAILED DESCRIPTION

The following description relates to the invention as it applies to a model kitchen for the ultimate construction of a full size kitchen; however, it will be understood that the principles herein disclosed apply to other types of rooms and spaces and that the invention is not to be limited only to kitchen construction.

Figure 1:
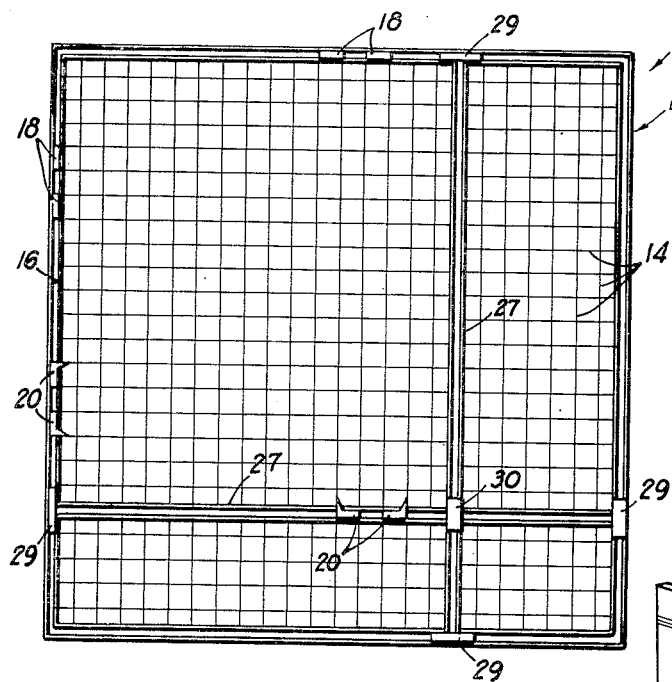
FIG. 1 is a plan view of the floor planning surface and its attachments in the kit for constructing a miniaturized model kitchen.
Figure 2:
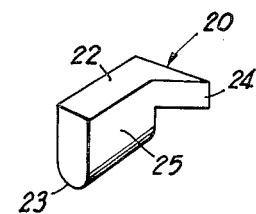
FIG. 2 is an enlarged perspective view of one of the doorway designator components of the floor planning surface shown in FIG. 1.

Referring now in more detail to the drawing, there is shown in FIG. 1 a miniaturized kitchen floor 10 having a rectangular periphery bounded by a race 12 affixed thereto. The floor is seen to be marked with a grid of uniformly spaced, right-angularly intersecting lines 14 which delineate scaled length and width floor dimensions. If desired, the floor surface may be made of a transparent sheet with the opaque grid etched thereon, under which colored sheets can be inserted. Race 12 is provided with open top, semi-cylindrical groove 16 in which several window designators 18 are slidably and removably positioned. Doorway designators 20 are also seen to be slidably and removably positioned in the race. As shown more clearly in FIG. 2, the doorway designators are of unitary block construction having a flat top 22, a semi-cylindrical bottom 23, and a wedge-shaped section 24 protruding from an otherwise planar side 25. When properly placed upon the fixed race the wedge-shaped sections overlap the portion of the floor next to the race to inhibit the placement of a module representative of a kitchen unit adjacent thereto which would obstruct the designated doorway. The window designators 18 are of similar construction but without the wedge-shaped section since kitchen units may ordinarily be placed above and below the windows.

With continued reference to FIG. 1, the floor planning structure for a miniaturized kitchen model is further seen to include a pair of mutually traversed movable races 27 having ends 29 formed with rounded bottoms supported upon and slidably received within the fixed race 12. These movable races also have a semi-cylindrical open top groove designed to receive kitchen wall opening designators such as window designators 18 and doorway designators 20. One of the movable races is provided with a movable sleeve 30 through which the other movable race movably extends in traversing the movable race to which the sleeve is mounted. So constructed and assembled, the movable races 27 may be easily repositioned above floor 10 to alter the size of a represented kitchen, and doorways and windows in the kitchen wall easily designated and redesignated.

Figure 3:
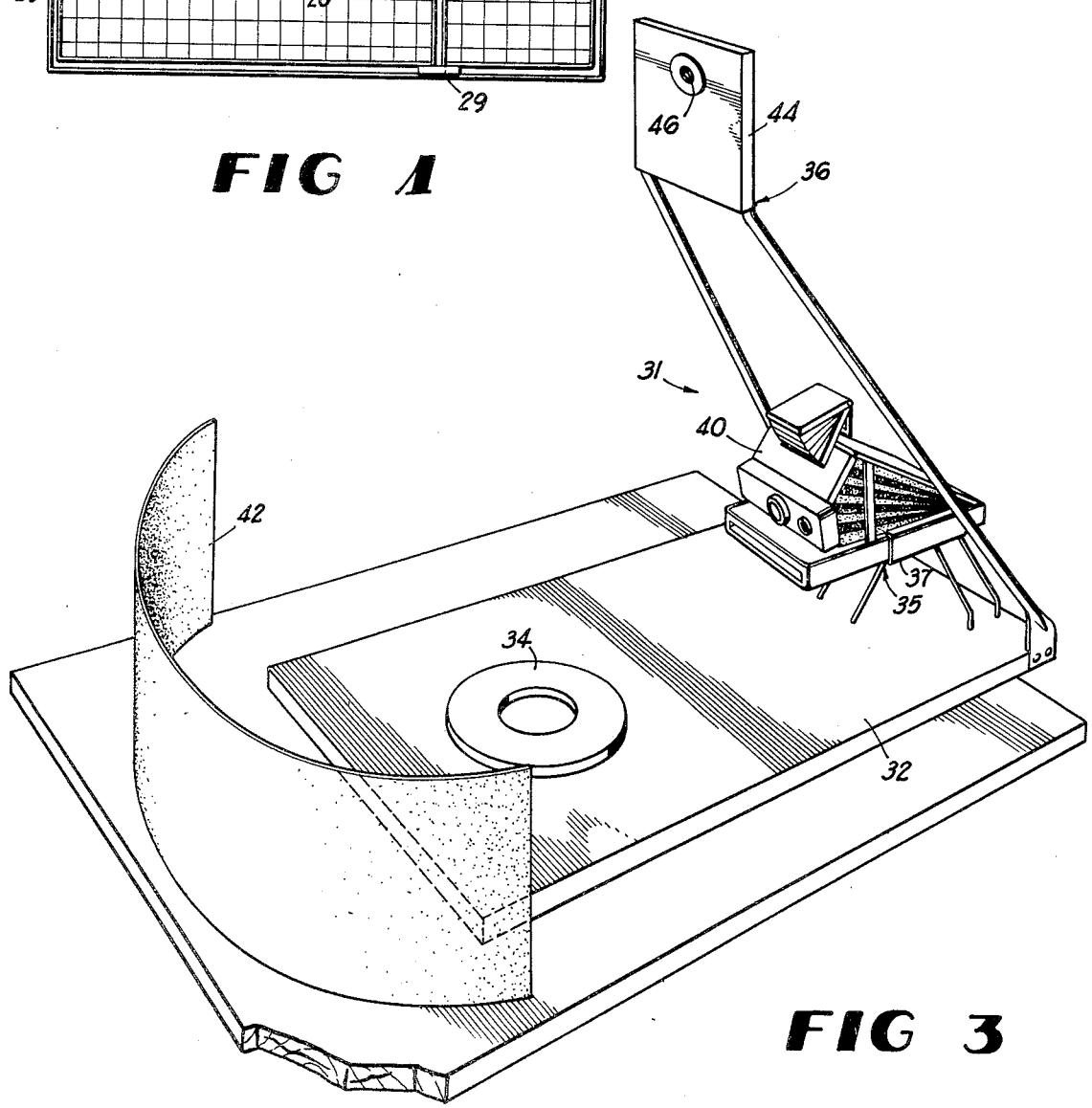
FIG. 3 is a perspective view of a stand which includes a base and camera mount assembly upon which the model kitchen arranged on the floor planning surface shown in FIG. 1 may be placed and photographed.
Figure 4:
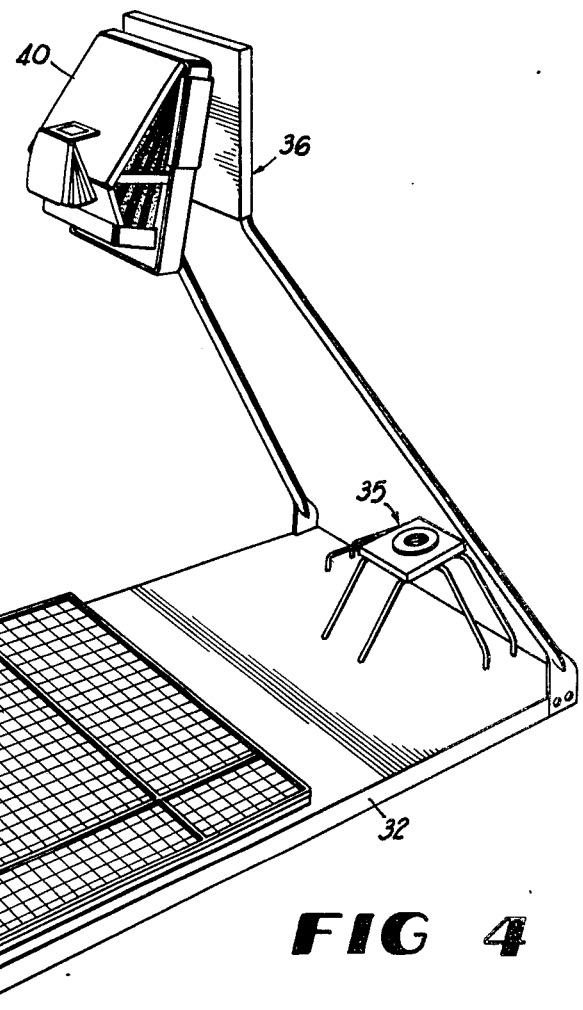
FIG. 4 is another perspective view of the base and camera mount stand shown in FIG. 3 together with the floor planning surface for receiving a model kitchen and a camera mounted thereon for the making of a plan view photograph of the kitchen.

With reference next to FIGS. 3 and 4, the stand 31 includes a base 32 on which a turntable 34 is mounted. To one end of the base is secured a lower camera mount or easel 35 and an upper camera mount or easel 36. The lower mount includes a horizontal platform 37 to which in FIG. 3 is shown mounted, by conventional fittings, a camera 40. The camera 40 is here mounted for taking a prospective view photograph of a model kitchen supported upon base 32 in front of a curtain backdrop 42 erected at the opposite end of the base. The upper mount includes a vertical backboard 44 having a similar fitting 46 to which camera 40 may be mounted as shown in FIG. 4 to make a plan view photograph of the kitchen.

Figure 5:
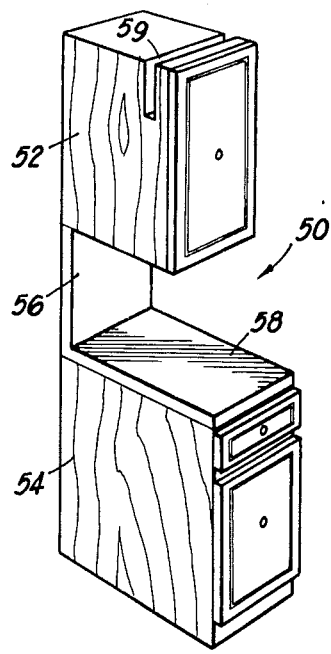
FIG. 5 is a perspective view of a module for a miniaturized model kitchen embodying principles of the invention.

With reference next to FIG. 5, a module 50 is shown of unitary construction comprising a rectangular upper block section or body 52 having its face marked to represent a cabinet door, and a rectangular lower block section or body 54 also having its face marked to represent a cabinet drawer and door. The upper section is supported above the lower section by a rectangular lay-up panel section 56 which appears as the covering of a wall to which the two cabinets are mounted when the module is placed in tandum in abutment with other modules. The top 58 of the lower block may be of the same color as panel 56 to represent a counter top color coordinated with the lay-up panel on the kitchen wall. A valance slot 59 is formed in the top side of the upper block to receive a valance which may be inserted and adjusted therein as hereafter described.

Figure 6:
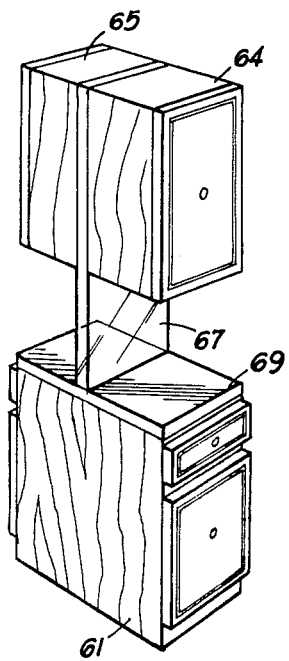
FIG. 6 is a perspective view of another module for a miniaturized model kitchen embodying principles of the invention in another form.

In FIG. 6 a modulu in another form is shown of integral construction comprising a lower body 61, and upper bodies 64 and 65 mounted back to back and supported above the center of the lower body by a substantially transparent panel 67. So constructed and appropriately marked the module represents a lower base cabinet with counter top 69 above which are spacially suspended two upper cabinets mounted back to back.

Figure 7:
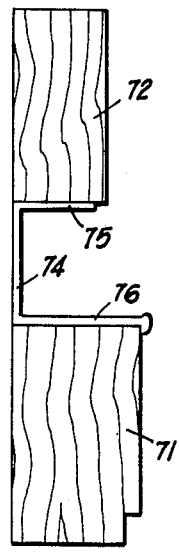
FIGS. 7 and 8 are side elevational views of the module shown in FIG. 5 in alternate forms of construction.
Figure 8:
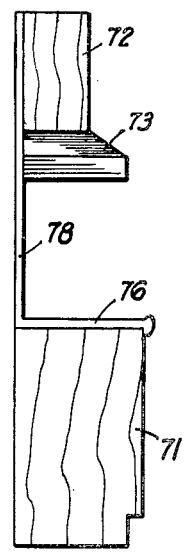

In FIGS. 7 and 8 the module illustrated in FIG. 5 is shown in another structural form that, though integral, is not necessarily unitary. In FIG. 7 the module is seen to include a lower body or block 71 and an upper body or block 72 again marked, colored and finished to represent lower and upper cabinets, respectively. As with the other modules the blocks are preferably of wood or plastic material. The upper body is mounted above the lower by a generally C-shaped member having a vertical panel 74 from which projects an upper horizontal panel 75 and a lower horizontal panel 76. The lower panel overlays the lower body and represents a counter top while the upper panel underlays and at least partially supports the upper body. The vertical panel 74 again represents a kitchen wall covering or lay-up panel. In FIG. 8 a similar structure is shown except that here the upper and lower joining member 78 is L-shaped and has its upper section extending behind and mounted to the upper body, in this case a cabinet 72 and a hood 73.

With reference next to FIG. 9 two structurally independent modules 80 and 81 are shown. Module 80 is seen to comprise a lower body 84 and an upper body 85 supported above the lower body by an upright panel 86 extending vertically between the backs of the two bodies. The two bodies and panels are colored and marked to represent an upper cabinet supported above a lower corner blind cabinet by a lay-up panel. The top of the upper cabinet is printed with identification indicia 88. The other module 81 is seen to comprise a block 90 and a panel 91 projecting laterally from the top of the block. Identification indicia 93 is printed to the top of block 90 and identification indicia 94 also printed atop the projecting panel. A face of the block is marked to represent a cabinet. So constructed and marked module 90 may be placed against upper block 85 of module 80 as shown in broken lines with panel 91 overlaying the top of block 85 and with a vertical side of block 90 flush against the face of block 85. In this manner module 90 is securely mounted to module 80 and the upper portions of assembly made to represent a peninsula corner set of elevated cabinets. Since panel 91 now covers indicia 88, the identification is simultaneously changed to read that atop module 90 and its overhanging panel 91.

With reference next to FIG. 10 another module modification is shown for use with the first described module 80. Here, the modification is accomplished by the use of an inverted L-shaped auxiliary member having an upright panel comprising a relatively narrow upper portion 98 and a relatively wide lower portion 99. The L-shaped member also has a top panel 101 projecting laterally from the top of the upright panel and bearing identification markings 103. So constructed and appropriately marked the auxiliary member may be placed flush against the side of module 80 with panel 103 overlaying the identification and upper cabinet of module 80 and thereby changing its identification. As a result module 80 is now seen to abut a corner wall with lay-up panel provided by the portion 98' of the narrow upper portion 98 of the auxiliary member as shown in broken lines. The thickness 95 of auxiliary member 96 is appropriately designed to move module 80 out sufficiently from the abutted wall so that in the full scale kitchen the drawer shown on base cabinet 84 would not be obstructed by the knobs of drawers on base cabinets of adjoining modules placed along the abutted wall and against the blind face 97 of module 80.

Referring now to FIG. 11, the previously described module 50 is shown positioned for mounting next to module 106 representing a kitchen sink under a window and to a valance 108. Module 106 has a detachable vertical panel 107 which has curtain and header printed thereon and a lower horizontal slot 112 sized to receive the tongue 114 projecting from the rear of module 106 which permits module 106 to be laterally adjusted therein. The valance 108 has a tongue 110 sized to fit within groove 59 of upper body 52 of modules 50 positioned on each side of module 106 and to be laterally adjustable therein. Assembly of the three modules thus creates the appearance of a kitchen sink in front of a window shaped by a valance aside the kitchen wall to which upper and lower cabinets are mounted.

Figure 12:
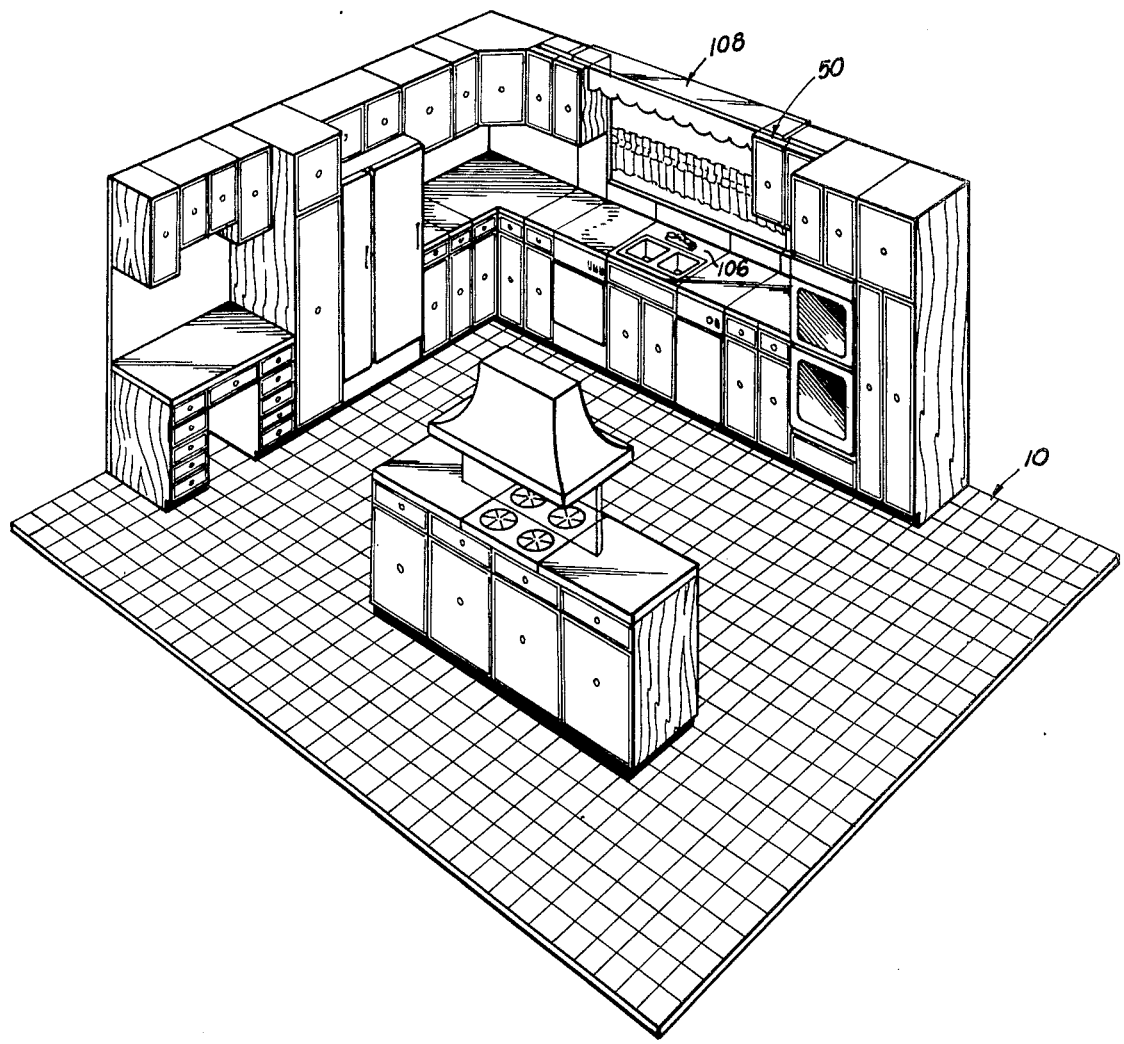
FIG. 12 is a perspective view of a miniaturized model kitchen having a kitchen floor of the type shown in FIG. 1 with an assembled set of modules placed thereon for viewing or photographing.
Figure 13:
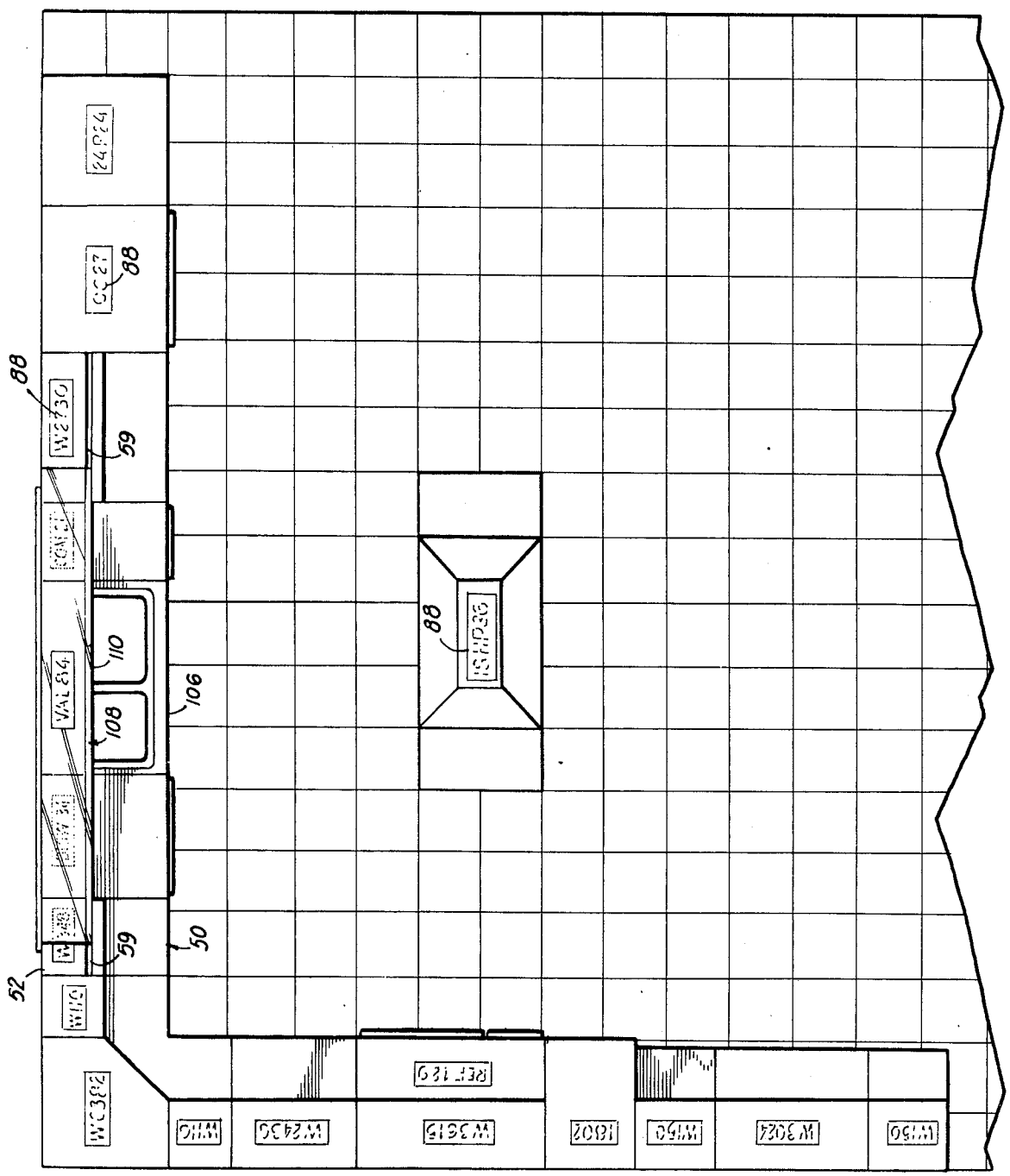
FIG. 13 is a plan view of the model kitchen shown in FIG. 12.

There are, of course, a great number of overall designs made possible by modules and model kitchens constructed in accordance with the invention. One of these is illustrated in FIGS. 12 and 13. And, of course, the principles described herein have applications other than the design, display and photography of kitchens. For example, the principles disclosed and claimed may be readily utilized for other rooms in a house, and utilized by artists and architects, motion picture producers and theatrical set designers. Moreover, the features of the miniature models described and illustrated herein can be utilized in full scale. For example, the C-shaped bracket 74, 75, 76 of FIG. 7 is usable in full size to support a wall mounted cabinet from the top surface of a floor cabinet, either permanently or temporarily while the workman hangs the wall cabinet on the wall, and the auxiliary member 96 of FIG. 10 is usable in full size to form an end surface of the end of a floor and wall mounted cabinet combination. It thus should be clearly understood that the described embodiments merely illustrate principles of the invention in selected, preferred forms, and that many modifications, additions and deletions may be made thereto without departure from the spirit and scope of the invention as set forth in the following claims.

I claim:

1. A stand for assembling a miniature model kitchen or the like comprising a platform, a turntable rotatably mounted on said platform, an upper camera mount positioned on said base above said turntable for mounting a camera with line of sight directed vertically with respect to said base, a lower camera mount positioned on said base adjacent said turntable for mounting a camera with line of sight directed at a downward incline toward said base, and a floor surface resting on said turntable, whereby a miniature model kitchen or the like can be assembled on the floor surface and the floor surface rotated with the turntable and a camera supported on the upper or lower camera mount actuated to photograph the miniature model kitchen from various angles.

2. The stand in accordance with claim 1 and wherein said floor surface comprises a transparent sheet and an opaque grid applied to said sheet.

3. A system for assembling a miniature model kitchen or the like comprising turntable, a floor surface on said turntable, an upper camera mount positioned above the floor surface for mounting a camera with a line of sight directed vertically downwardly toward said floor surface, a lower camera mount laterally offset from above the floor surface for mounting a camera with a line of sight directed at a downward incline toward the floor surface, and a plurality of miniature model cabinet and appliance modules and the like for placement on said floor surface, at least some of said model cabinet and appliance modules bearing indicia on their upper surfaces corresponding to the identity of a full size cabinet or appliance which corresponds in size and shape to the module, whereby a camera can be supported on the upper or lower camera mount, a miniature model kitchen or the like assembled on the floor surface, the floor surface rotated on the turntable to various positions, and the camera actuated to photograph the modules of the miniature model kitchen from various angles to show the arrangement of the modules and the identity of the full size cabinets or appliances which correspond to the modules.

4. An apparatus for acquiring photographic representation of a full scale object by photographing a scaled model of the full sized object, said apparatus comprising:

a scaled, three-dimensional, miniaturized model of said full-scale object;
a base upon which said model is supported;
a turntable means mounted to said base rotatably supporting said model;
a lower camera mount positioned on said base laterally offset above said turntable for mounting a camera with line of sight directed downwardly toward said base;
an upper camera mount positioned on said base above said turntable for mounting a camera with line of sight directed more vertically with respect to said base.

* * * * *